United States Patent
Graefenstein et al.

(10) Patent No.: US 10,538,164 B2
(45) Date of Patent: Jan. 21, 2020

(54) RECHARGEABLE BATTERY ASSEMBLY FOR A VEHICLE

(71) Applicant: MANN+HUMMEL GMBH, Ludwigsburg (DE)

(72) Inventors: Andreas Graefenstein, Karlsruhe (DE); Markus Beylich, Ludwigsburg (DE); Marcel Mayer, Stuttgart (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 188 days.

(21) Appl. No.: 15/613,241

(22) Filed: Jun. 4, 2017

(65) Prior Publication Data

US 2017/0267109 A1  Sep. 21, 2017

Related U.S. Application Data

(63) Continuation of application No. PCT/EP2015/076869, filed on Nov. 17, 2015.

(30) Foreign Application Priority Data

Dec. 4, 2014  (DE) .................. 10 2014 018 230

(51) Int. Cl.
| | |
|---|---|
| *H01M 12/02* | (2006.01) |
| *H01M 2/02* | (2006.01) |
| *B60L 11/18* | (2006.01) |
| *H01M 12/08* | (2006.01) |
| *H01M 2/18* | (2006.01) |
| *H01M 4/02* | (2006.01) |
| *H01M 4/38* | (2006.01) |

(Continued)

(52) U.S. Cl.
CPC ............... *B60L 11/18* (2013.01); *H01M 2/02* (2013.01); *H01M 2/18* (2013.01); *H01M 4/02* (2013.01); *H01M 4/38* (2013.01); *H01M 4/62* (2013.01); *H01M 10/44* (2013.01); *H01M 12/02* (2013.01); *H01M 12/08* (2013.01); *Y02E 60/128* (2013.01)

(58) Field of Classification Search
CPC ........ H01M 12/08; H01M 12/02; H01M 2/02; H01M 2/18; B60L 11/18
See application file for complete search history.

(56) References Cited

U.S. PATENT DOCUMENTS

| | | | | |
|---|---|---|---|---|
| 4,604,110 | A * | 8/1986 | Frazier | ...................... A61L 9/00 |
| | | | | 95/128 |
| 2003/0017376 | A1* | 1/2003 | Tsai | .................... H01M 6/5038 |
| | | | | 429/404 |

(Continued)

FOREIGN PATENT DOCUMENTS

| | | |
|---|---|---|
| CN | 1649196 A | 8/2005 |
| DE | 102009050878 A1 | 4/2011 |

(Continued)

*Primary Examiner* — Kenneth J Douyette
(74) *Attorney, Agent, or Firm* — James Hasselbeck (57) ABSTRACT

A rechargeable battery assembly for a vehicle has a housing and at least one metal-air rechargeable battery arranged in the housing. A filter device is arranged in the housing and conditions the inlet air of the at least one metal-air rechargeable battery such that the inlet air exhibits a predetermined air humidity. A flow deflecting device is provided that deflects the inlet air in the housing such that the filter device can be regenerated by waste heat of the at least one metal-air rechargeable battery.

3 Claims, 9 Drawing Sheets

(51) Int. Cl.
*H01M 4/62* (2006.01)
*H01M 10/44* (2006.01)

(56) References Cited

U.S. PATENT DOCUMENTS

| | | | |
|---|---|---|---|
| 2009/0239132 A1 | 9/2009 | Johnson | |
| 2010/0330437 A1* | 12/2010 | Burchardt | H01M 8/184 |
| | | | 429/406 |
| 2012/0237838 A1* | 9/2012 | Uesaka | H01M 12/06 |
| | | | 429/405 |

FOREIGN PATENT DOCUMENTS

| | | |
|---|---|---|
| DE | 102011084351 A1 | 4/2013 |
| DE | 102013222663 A1 | 5/2015 |
| EP | 2533325 A1 | 12/2012 |

* cited by examiner

RECHARGEABLE BATTERY ASSEMBLY FOR A VEHICLE

CROSS-REFERENCE TO RELATED APPLICATIONS

This application is a continuation application of international application No. PCT/EP2015/076869 having an international filing date of 17 Nov. 2015 and designating the United States, the international application claiming a priority date of 4 Dec. 2014, based on prior filed German patent application No. 10 2014 018 230.4, the entire contents of the aforesaid international application and the aforesaid German patent application being incorporated herein by reference.

BACKGROUND OF THE INVENTION

The present invention relates to a rechargeable battery assembly for a vehicle, wherein the rechargeable battery assembly comprises a metal-air rechargeable battery.

Due to their achievable high-energy density, metal-air rechargeable batteries are suitable in particular for mobile applications, for example, for vehicles. An example of metal-air rechargeable batteries are lithium-air rechargeable batteries. Their function will be explained briefly in the following. When the lithium-air rechargeable battery is discharged, an electron is released at a lithium anode and a positive lithium ion passes through an electrolyte to a carbon cathode. At the carbon cathode, the lithium ion reacts with oxygen in a reduction process first to lithium oxide and then to lithium peroxide. In order for this reduction process to take place, the carbon cathode is coated with a catalyst, is highly porous, and comprises therefore a very large surface area. When charging the lithium-air rechargeable battery, this process is reversed. Oxygen is released at the carbon cathode; metallic lithium is deposited at the lithium anode.

The lithium anode is moisture sensitive because the metallic lithium can react violently with water. Due to its high porosity, the carbon cathode, on the one hand, is susceptible to contamination with particles such as dust or sand and, on the other hand, harmful gases contained in the air can act as catalyst poisons that can irreversibly damage the carbon cathode. Up to now, lithium-air rechargeable batteries and also other metal-air rechargeable batteries have been tested only under laboratory conditions and loaded with high-purity gases in this context.

SUMMARY OF THE INVENTION

It is therefore object of the present invention to provide an improved rechargeable battery assembly.

Accordingly, a rechargeable battery assembly for a vehicle is proposed, comprising at least one metal-air rechargeable battery, a filter device that is configured to condition the inlet air of the metal-air rechargeable battery in such a way that the inlet air exhibits a predetermined air humidity, and a housing in which the metal-air rechargeable battery and the filter device are received, wherein the inlet air by means of a flow deflecting device can be deflected in the housing such that the filter device can be regenerated by means of waste heat of the metal-air rechargeable battery. In this context, inlet air that is guided past the metal-air rechargeable battery by means of a deflection and is thereby heated or hot waste air of the metal-air rechargeable battery can be employed.

In particular, in the housing a plurality of metal-air rechargeable batteries can be provided that are arranged adjacent to each other or on top of each. The metal-air rechargeable battery comprises preferably an anode or first electrode which is manufactured of a metal and a cathode or second electrode which is manufactured of mesoporous carbon. Depending on which metal is employed as material for the first electrode, the filter device is configured to adjust the relative air humidity contained in the inlet air to a value which is required for the metal. When the first electrode is manufactured of lithium, for example, it is required to remove from the inlet air the entire or at least approximately the entire air humidity because of the high reactivity of lithium with water. When using silicon as electrode material, it is required, on the other hand, that the air humidity contained in the inlet air is controlled by means of the filter device to a defined and constant value. In this way, damage to the metallic electrode material is prevented for the service life of the metal-air rechargeable battery. In this way, the rechargeable battery assembly can be employed under real conditions in a vehicle. Supplying the metal-air rechargeable battery with high-purity gases under laboratory conditions is not necessary. By conditioning the inlet air, the metal-air rechargeable battery is protected from damage. The service life of the metal-air rechargeable battery is increased and the use under various conditions is enabled. Preferably, the rechargeable battery assembly comprises sensor devices such as humidity sensors and a control and/or regulating device coupled to the sensor devices. By means of the sensor devices, it is possible to determine early on a change of the filter performance or drying performance that can be displayed as a status indication or maintenance indication by means of a corresponding indicating device. Preferably, the metal-air rechargeable battery heats the inlet air. The filter device can be regenerated by means of the inlet air heated by the metal-air rechargeable battery.

The rechargeable battery assembly is in particular suitable for vehicles such as motor vehicles, trucks, motorcycles, aircraft, construction vehicles, rail vehicles, and watercraft. Moreover, the rechargeable battery assembly can also be used for immobile applications as in building technology or the like.

In embodiments, the flow deflecting device is configured to reverse a flow direction of the inlet air for regenerating the filter device. The flow deflecting device can comprise air paths, air inlets, venting flaps, venting screens or the like.

In further embodiments, the rechargeable battery assembly comprises a heating element for heating the inlet air and/or the filter device. The heating element can be a heating film, heating plate, heating wire, heating fabric or a heating fleece pad. By means of the inlet air which is heated by the heating element, the filter device can be regenerated. In particular, the filter device can be directly heated by means of the heating element.

In further embodiments, the filter device is configured to filter particles, in particular dust, sand or the like, out of the inlet air. In this way, clogging or blocking of the mesoporous second electrode is prevented. For particle filtration, the filter device can comprise a filter medium manufactured of paper an/or plastic material. Moreover, the filter medium can be coated, impregnated, and/or provided with a nanofiber layer.

In further embodiments, the filter device is configured to chemically filter harmful gases, in particular nitrogen oxides, ammonia, sulfur oxides, hydrogen sulfide, carbon monoxide or the like, from the inlet air L. The harmful gases may act as catalyst poisons that can permanently damage the catalyst provided on the second electrode. The filter device may comprise, for example, activated carbon for chemical filtration. Moreover, the filter element may comprise potassium carbonate $K_2CO_3$ and/or calcium hydroxide $Ca(OH)_2$ that reacts chemically with acidic harmful gases such as sulfur oxides $SO_x$ or hydrogen sulfide $H_2S$ in order to neutralize these harmful gases. In this way, the catalyst action is maintained permanently.

In further embodiments, the filter device can be flushed by means of the flow deflecting device with inlet air for regenerating the chemical filtration properties. For regenerating the filter device when its chemical filtration performance decreases, it can be flushed with fresh inlet air. For this purpose, appropriate channels and valve devices can be provided in the housing.

In further embodiments, the housing exhibits a flow-distributing geometry that is configured to distribute the inlet air such that the inlet air can flow across the surface of the at least one metal-air rechargeable battery. In particular, the inlet air can flow across the surface of the second electrode. In this way, the efficiency of the metal-air rechargeable battery is increased.

In further embodiments, the filter device comprises for conditioning the inlet air a rotary storage device which is rotatable relative to the housing. The rotating storage mass has the advantage of heat transfer. The inlet air for the metal-air rechargeable battery can be preheated by means of the rotary storage device. This is in particular advantageous for a so-called cold start phase because the metal-air rechargeable battery, similar to a fuel-cell system, reaches in a shorter period of time its operating temperature. The rechargeable battery assembly may comprise furthermore a control and/or regulating device that controls the air flow through the housing by means of sensor devices such as, for example, temperature or humidity sensors, and by control of valve devices. For example, a rotary speed control can be carried out for a continuous regeneration by means of the rotary storage device. The embodiment of the rechargeable battery assembly with the rotary storage device enables an extended service life of the drying or sorption agent. In this way, the operating costs are reduced while the correct operating conditions for the metal-air rechargeable battery are maintained.

In further embodiments, a drying agent is received in the rotary storage device. The rotary storage device can be coated with the drying agent.

In further embodiments, the drying agent can be continuously regenerated by means of the rotary storage device. In this way, the exhaust air that is heated by the metal-air rechargeable battery can assist in regenerating the drying or sorption agent. An auxiliary heating device in the form of a heating element can be designed to be smaller or can be eliminated completely.

Further possible implementations of the rechargeable battery assembly comprise also combinations, not explicitly mentioned, of features or configurations of the rechargeable battery assembly described above or in the following with regard to the embodiments. In this context, a person of skill in the art will also add or modify individual aspects as improvements or supplements to the respective basic form of the rechargeable battery assembly.

Further embodiments of the rechargeable battery assembly are subject matter of the dependent claims as well as of the embodiments of the rechargeable battery assembly described in the following. In the following, the rechargeable battery assembly will be explained in more detail with the aid of embodiments with reference to the attached figures.

BRIEF DESCRIPTION OF THE DRAWINGS

In the Figures, the same reference characters identify same or functionally the same elements as far as nothing to the contrary is indicated.

DETAILED DESCRIPTION

Figure 1:
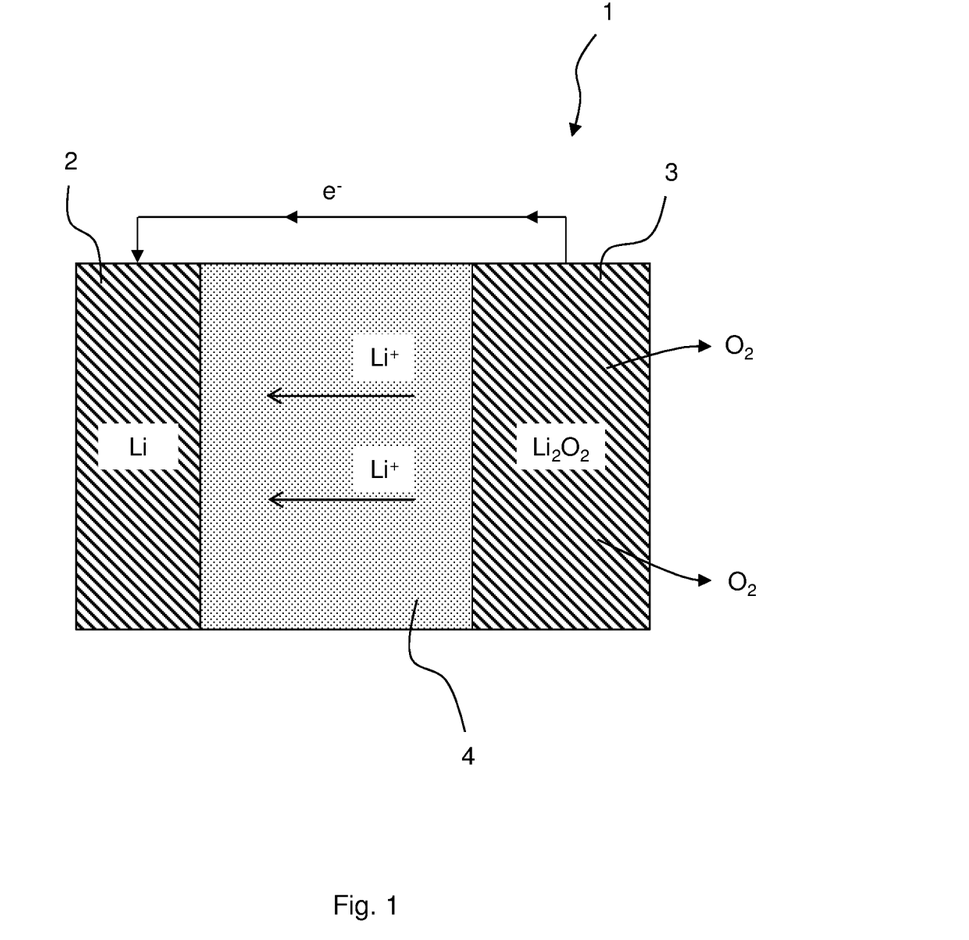
FIG. 1 shows a schematic section illustration of an embodiment of a metal-air rechargeable battery in a charging state.
Figure 2:
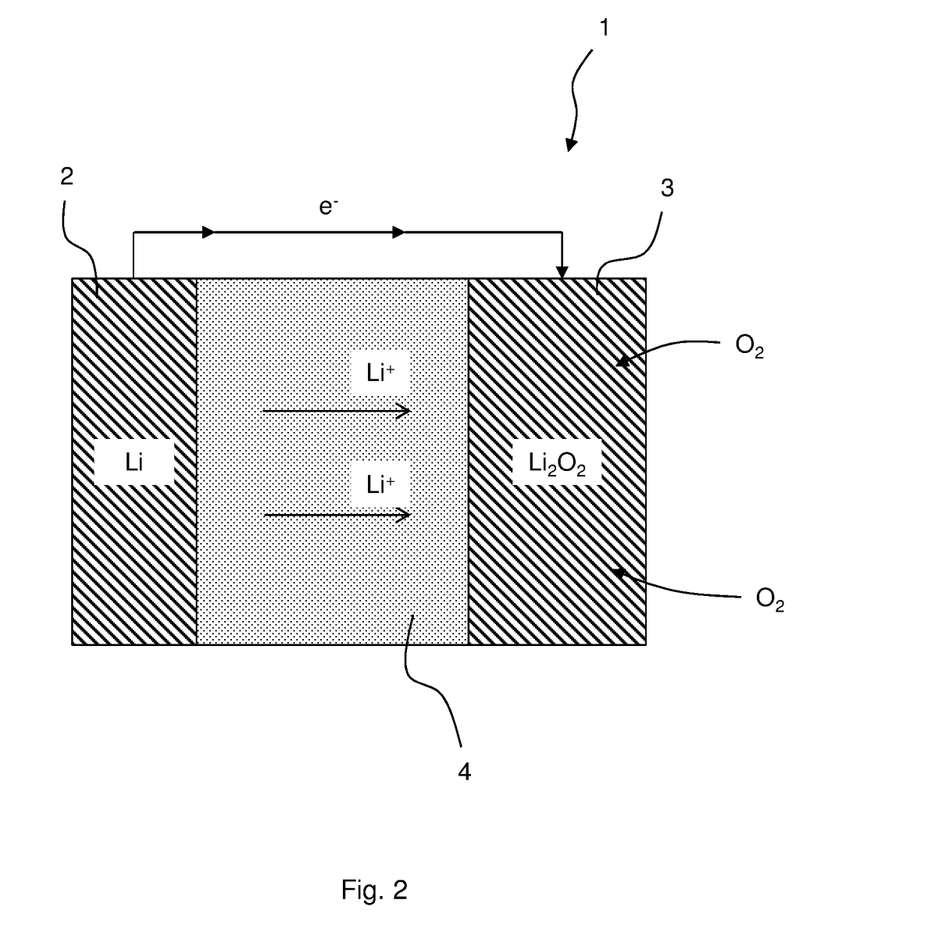
FIG. 2 shows a schematic section illustration of the metal-air rechargeable battery according to FIG. 1 in a discharging state.

FIG. 1 shows a schematic section view of a metal-air rechargeable battery 1 in a charging state. FIG. 2 shows a schematic section illustration of the metal-air rechargeable battery 1 in a discharging state. The metal-air rechargeable battery 1 comprises an anode or first electrode 2 manufactured of metal, in particular of lithium Li, and a cathode or second electrode 3. In the following, only lithium-air rechargeable batteries 1 are explicitly described.

The second electrode 3 is constructed of mesoporous carbon C and is not directly participating in the electrochemical process. According to the definition of the International Union of Pure and Applied Chemistry (IUPAC), mesoporous solid bodies are porous materials with a pore diameter between 2 nm and 50 nm. Carbon C serves as an electrical conductor and connector; the mesoporous structure serves for maximizing the surface area in order to facilitate the reaction of oxygen $O_2$ with lithium ions $Li^+$ in the area of the second electrode 3.

The first electrode 2 is comprised of metallic lithium Li. Alternatively, the first electrode 2 can be comprised of a different metal, for example, silicon. Between the two electrodes 2, 3, there is an electrolyte 4 which can be liquid or solid depending on the embodiment of the lithium-air rechargeable battery 1. In case of a solid electrolyte, a solid state rechargeable battery is provided.

Moreover, the electrolyte 4 can be an organic liquid that does not react with the lithium Li.

Figure 3:
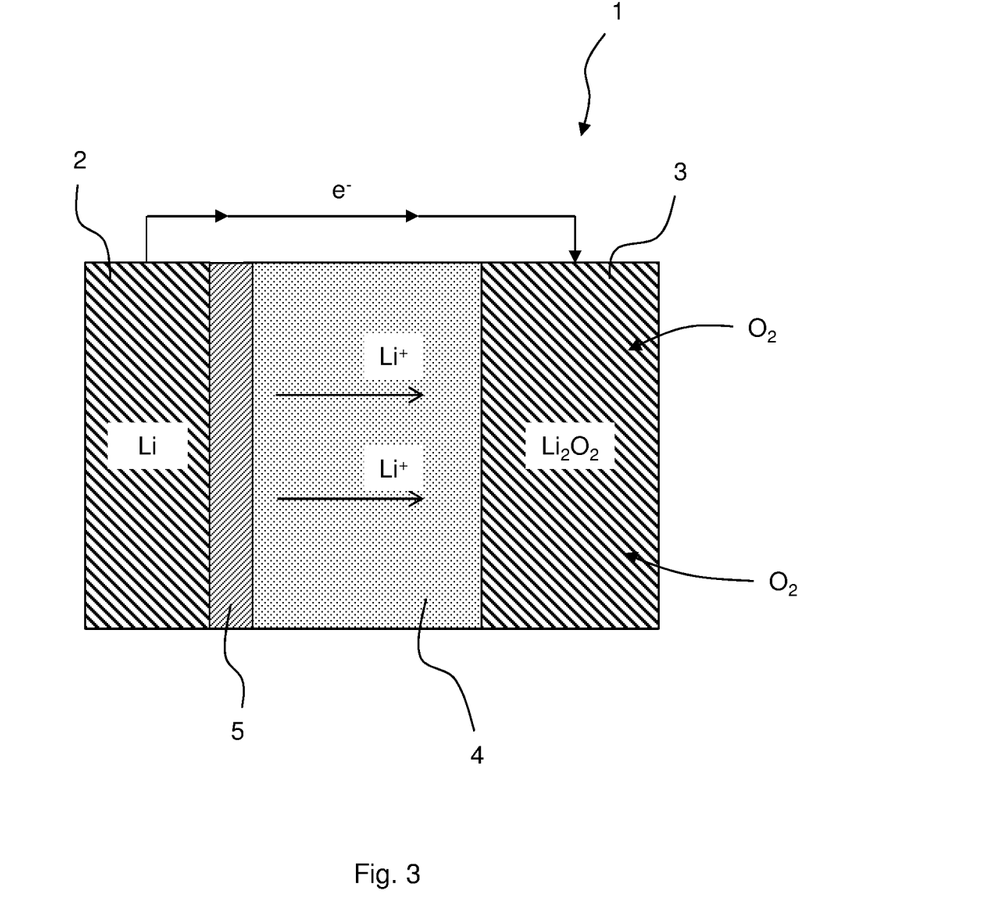
FIG. 3 shows a schematic section illustration of a further embodiment of a metal-air rechargeable battery in a discharging state.

FIG. 3 shows a schematic section illustration of an embodiment of a lithium-air rechargeable battery 1 with a water-based electrolyte 4. In order to prevent a reaction of the metallic lithium Li with the electrolyte 4, between the first electrode 2 and the aqueous electrolyte 4 a protective layer 5 is provided. The protective layer 5 can be a glass-ceramic layer applied to the metallic lithium Li. For example, the protective layer 5 is a so-called LISICON layer $(LiM_2(PO_4)_3)$. The protective layer 5 enables that the lithium Li remains stable in the aqueous environment.

Figure 4:
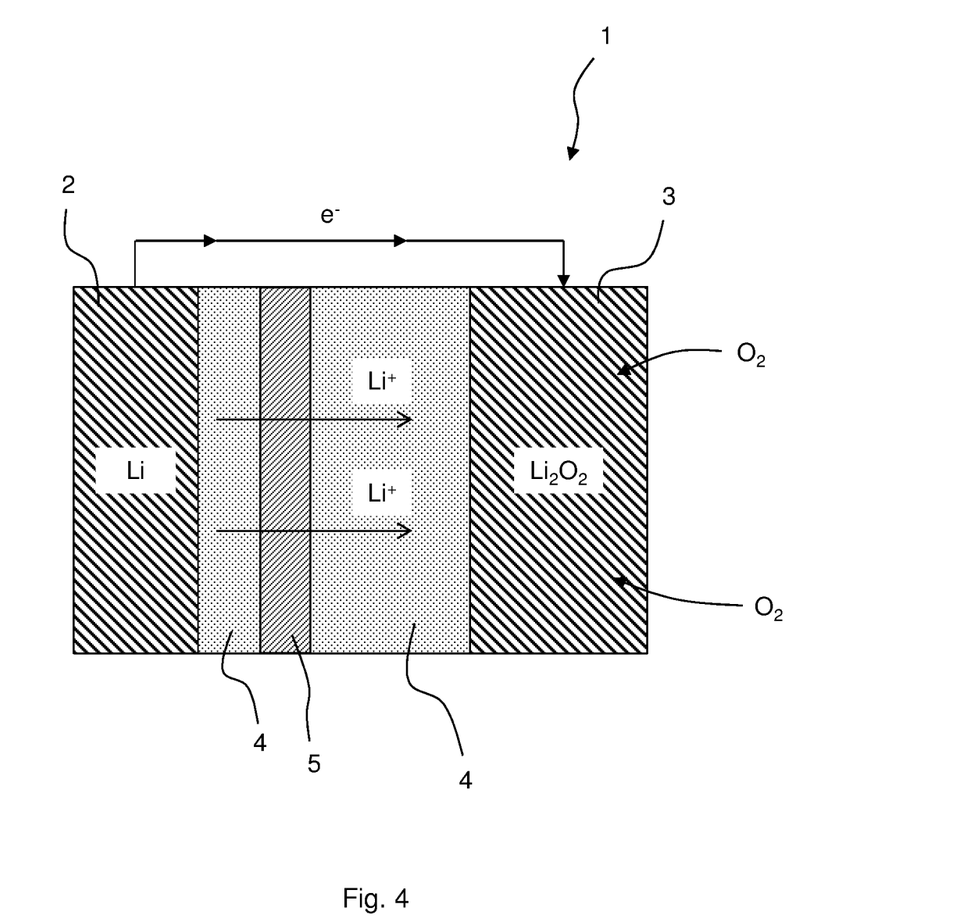
FIG. 4 shows a schematic section illustration of a further embodiment of a metal-air rechargeable battery in a discharging state.

FIG. 4 shows a schematic section view of an embodiment of a hybrid lithium-air rechargeable battery 1. Here, between the first electrode 2 and the protective layer 5 an organic electrolyte 4 and between the protective layer 5 and the second electrode 3 an aqueous electrolyte 4 are arranged.

The basic function principle in all types of lithium-air rechargeable batteries 1 is substantially identical. During discharge (FIGS. 2, 3, 4), an electron $e^-$ is released at the first electrode 2 and a positive lithium ion $Li^+$ is transferred through the electrolyte 4 to the second electrode 3 where the lithium ion $Li^+$ reacts with oxygen $O_2$ first to lithium oxide $Li_2O$ and subsequently to lithium peroxide $Li_2O_2$. The following reduction process takes place in this context: $O_2 + 4\ e^- \rightarrow 2\ O^{2-}$. In order for this reduction process to be able to take place, the second electrode 3 is coated with a catalyst, is highly porous, and comprises therefore a very large surface area. Therefore, the second electrode 3, on the one hand, is susceptible to contamination with particles such as, for example, dust or sand, that can clog or block the second electrode 3; on the other hand, harmful gases such as sulfur oxides $SO_x$, ammonia $NH_3$, nitrogen oxides $NO_x$, hydrogen sulfide $H_2S$, carbon monoxide CO, carbon dioxide $CO_2$ and others act as catalyst poisons that can irreversibly damage the second electrode 3. Moreover, the second electrode 3 is also moisture sensitive.

When charging (FIG. 1) the lithium-air rechargeable battery 1, this process is reversed. Oxygen $O_2$ is released at the second electrode 3; metallic lithium Li is deposited at the first electrode 2. The first electrode 2 is moisture sensitive because the metallic lithium Li can react violently with water.

Figure 5:
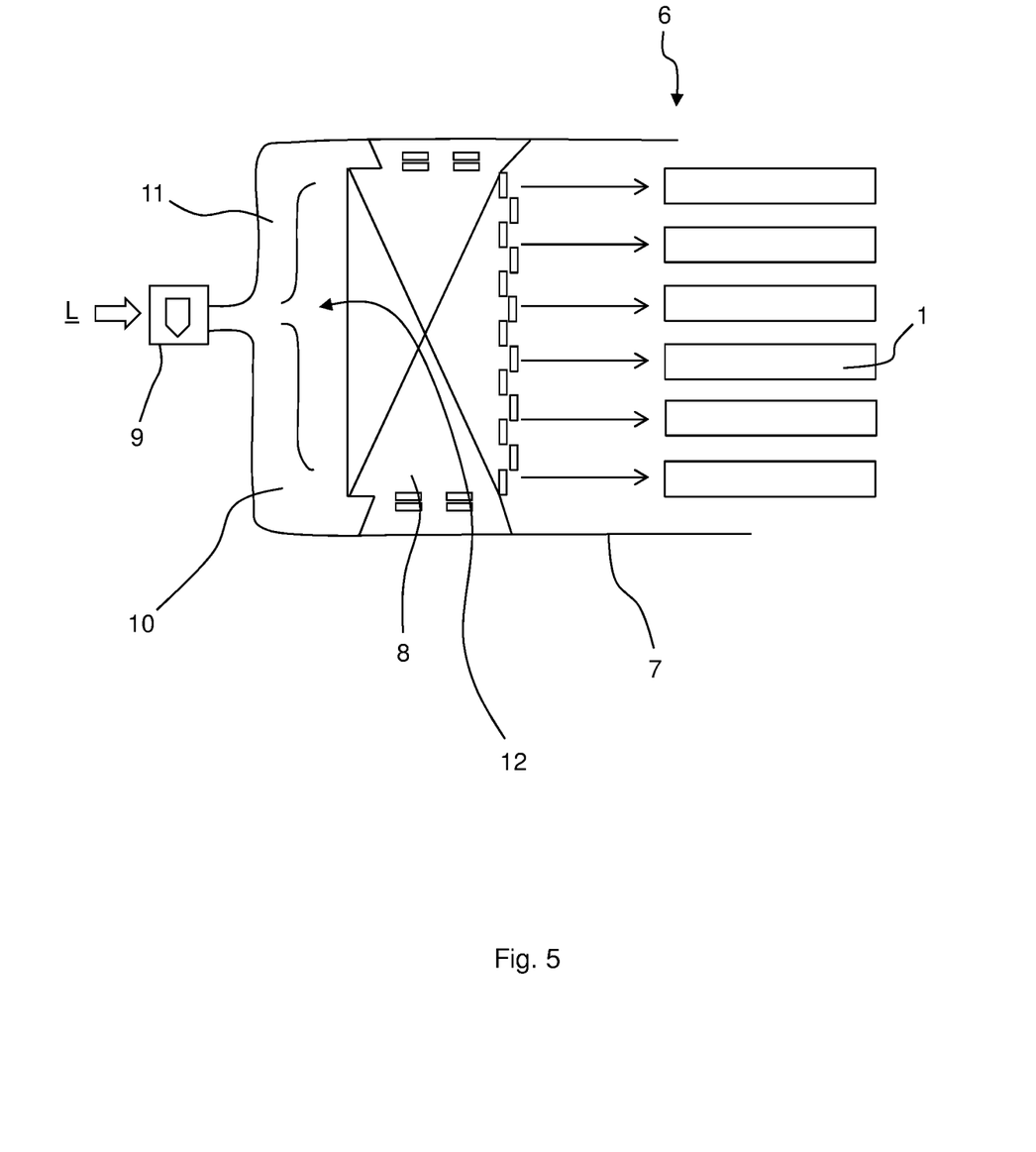
FIG. 5 shows a schematic section illustration of an embodiment of a rechargeable battery assembly.

FIG. 5 shows a rechargeable battery assembly 6 for a vehicle. The rechargeable battery assembly 6 comprises preferably a plurality of lithium-air rechargeable batteries 1 of which in FIG. 5 only one is identified by a reference character. The lithium-air rechargeable batteries 1 are preferably arranged adjacent to each other in a common housing 7. The lithium-air rechargeable batteries 1 are supplied with inlet air L. Upstream of the lithium-air rechargeable batteries 1, a filter device 8 and a separator device 9 are provided. The separator device 9 can be a cyclone separator. The separator device 9 is configured to remove particles, in particular coarse particles, from the inlet air L. The filter device 8 is arranged between the separator device 9 and the lithium-air rechargeable batteries 1. The pre-purified inlet air L is supplied to the filter device 8 through flow channels 10, 11 provided in the housing 7. The flow channels 10, 11 form a flow-distributing geometry 12 of the housing 7.

The filter device 8 is suitable for particle filtration. This means that the filter device 8 is configured to mechanically retain particles contained in the inlet air L, such as dust, pollen, sand or the like. In this way, clogging or blocking of the mesoporous second electrode 3 is prevented. For particle filtration, the filter device 8 can comprise a filter medium manufactured of paper and/or plastic material. Moreover, the filter medium can be coated, impregnated, and/or provided with a nanofiber layer.

Moreover, the filter device 8 is suitable for chemical filtration of the inlet air L. In particular, the filter device 8 is configured to chemically filter harmful gases, such as sulfur oxides $SO_x$, ammonia $NH_3$, nitrogen oxides $NO_x$, hydrogen sulfide $H_2S$, carbon monoxide CO, carbon dioxide $CO_2$, from the inlet air L. These harmful gases can act as catalyst poisons that can permanently damage the catalyst provided at the second electrode 3. The filter element 14 can comprise, for example, activated carbon for chemical filtration. Moreover, the filter element 14 can comprise potassium carbonate $K_2CO_3$ and/or calcium hydroxide $Ca(OH)_2$ that chemically reacts with acidic harmful gases such as, for example, sulfur oxides $SO_x$ or hydrogen sulfide $H_2S$ in order to neutralize these harmful gases. In this way, the catalyst action is permanently maintained. For regenerating the filter device 8 when its chemical filtration performance decreases, it can be flushed with fresh inlet air L. For this purpose, appropriate channels and valve devices are provided in the housing 7.

The filter device 8 is also configured to condition the inlet air L that is supplied to the lithium-air rechargeable batteries 1 in such a way that the inlet air L exhibits a predetermined relative air humidity. In particular, the filter device 8 is configured to remove the entire humidity from the inlet air L. In this way, a reaction of the metallic lithium Li of the first electrode 2 with water is prevented. When using other types of metal-air rechargeable batteries such as silicon-air rechargeable batteries, the filter device 8 can be configured to ensure a defined and constant value of the air humidity.

The filter device 8 can comprise a drying agent such as, for example, silica beads. The silica beads can be sprinkled onto a filter medium of the filter device 8 and can be glued thereto. Moreover, the filter medium can be of a layer structure, wherein, for example, a layer of silica beads can be arranged between two nonwoven layers. In addition or optionally, the filter medium can comprise an absorber material, in particular a so-called superabsorber, a functionalized membrane or the like. For each of the afore described functionalities, the filter device 8 can comprise a suitable filter element.

During discharging of the lithium-air rechargeable batteries 1, the purified inlet air L is guided such that it flows as uniformly as possible against the electrodes 3 of the lithium-air rechargeable batteries 1 In this way, the efficiency of the lithium-air rechargeable batteries 1 is increased. Moreover, the required mounting space is reduced. In the housing 7, further air channels can be provided that are configured to dissipate heat from the lithium-air rechargeable batteries 1. In this way, overheating of the lithium-air rechargeable batteries 1 is prevented. Liquid cooling can be provided also, as an alternative or as an optional feature. For this purpose, liquid channels can be provided in the housing 7.

Figure 6:
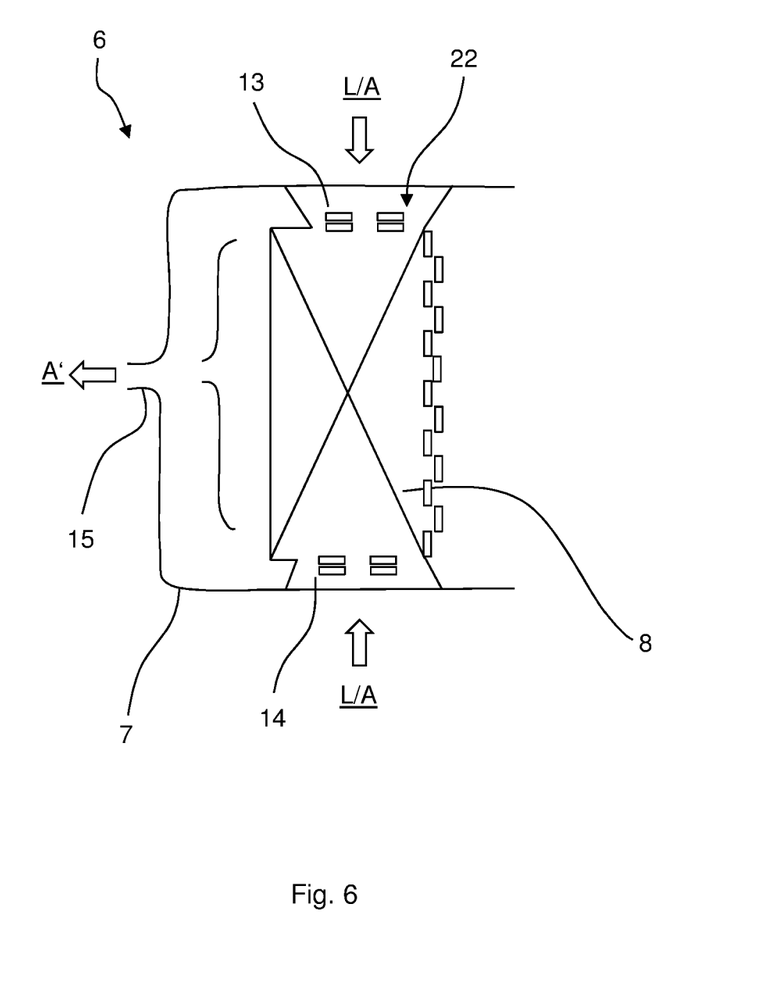
FIG. 6 shows a schematic section illustration of a further embodiment of a rechargeable battery assembly.

Should the drying performance of the filter device 8 decrease, the drying agent can be regenerated. For this purpose, preheated inlet air L or hot exhaust air A of the lithium-air rechargeable batteries 1 is used. FIG. 6 shows a schematic section illustration of an embodiment of a rechargeable battery assembly 6 in which the drying agent of the filter device 8 can be regenerated. For this purpose, air inlets 13, 14 are provided laterally on the housing 7, through which the inlet air L or exhaust air A of the lithium-air rechargeable batteries 1 can flow into the filter device 8. The inlet air L can be heated in that it is guided past the lithium-air rechargeable batteries 1 so that waste heat is transferred to the inlet air L that is passing by. The flow direction for regeneration is in reverse orientation compared to discharging of the lithium-air rechargeable batteries illustrated in FIG. 5. The lateral air inlets 13, 14 can form a flow deflecting device 22 of the rechargeable battery assembly 6. The flow deflecting device 22 can moreover comprise valve devices. For regenerating, the air path is blocked in the direction of the lithium-air rechargeable batteries 1. The heated inlet air L or the hot exhaust air A of the lithium-air rechargeable batteries 1 is blown or sucked into the housing 7 laterally through the air inlets 13, 14 and is blown out by central air inlet 15 of the housing 7 as exhaust air A'. The exhaust air A' exhibits a higher air humidity than the inlet air L. For regenerating the drying agent, a temperature of 180° C. is maintained, for example, for approximately 2 hours in a heating phase. In the discharge state of the lithium-air rechargeable batteries 1, the air inlets 13, 14 are closed and the air path is open in the direction of the lithium-air rechargeable batteries 1. The drying or sorption agent is regenerated by means of waste heat of the inlet air L or of the exhaust air of the lithium-air rechargeable batteries 1. Since the filter device 8 cannot be used as a filter and regenerated at the same time, two filter devices 8 can be provided which are operated alternatingly in discontinuous operation.

It is also possible to realize a plurality of discontinuously provided humidity-regulating systems in the filter device 8. In this way, there is always a sufficient drying performance ensured, even for a long phase of use, for frequent recuperation or quick charging phases where the charging times are not sufficiently long for a regeneration of the drying agent or of the sorption agent, or when using the rechargeable battery assembly 6 in an environment of high air humidity. Moreover, in addition to the discontinuous system, which is satisfactory with respect to its dimensioning for most of the application situations, a "backup" or "emergency" system can be provided that is based on using a single-use exchangeable cartridge. Once used, this exchangeable cartridge must be exchanged by the user or service technician before the backup system is available again for a new use.

Figure 7:
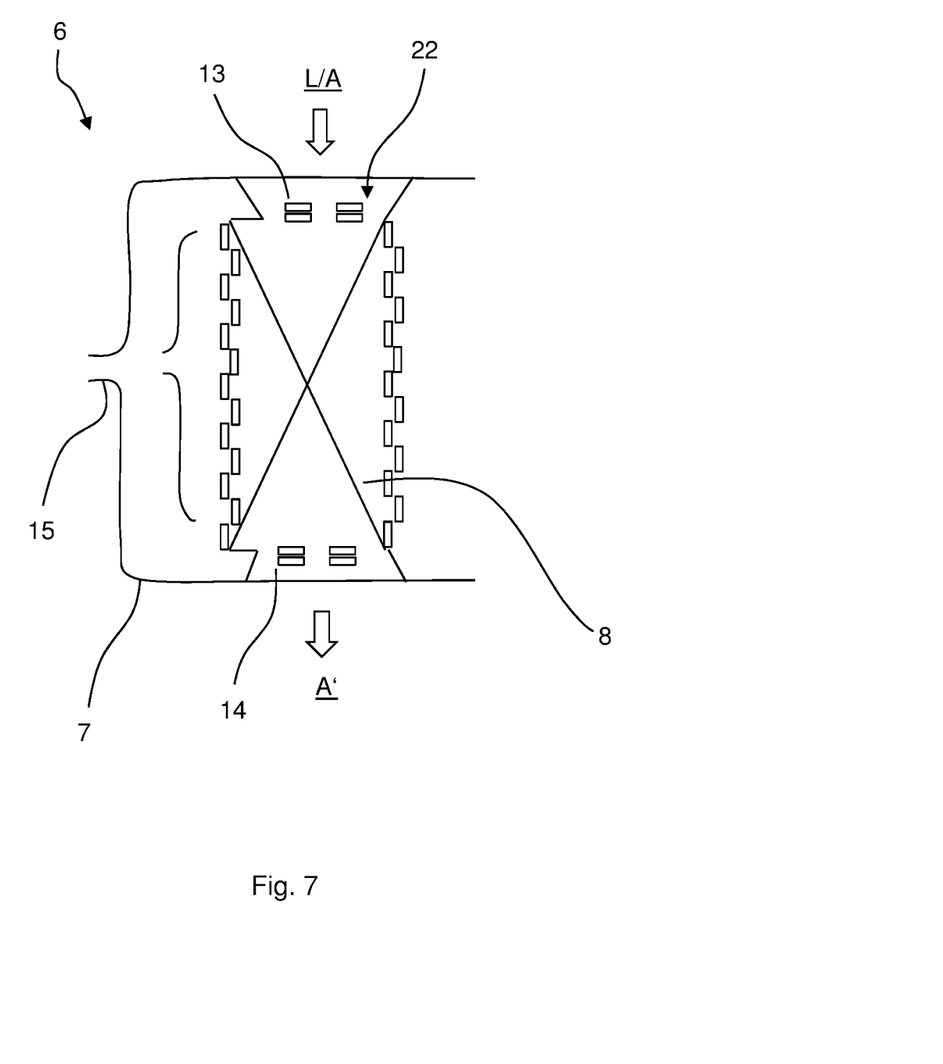
FIG. 7 shows a schematic section illustration of a further embodiment of a rechargeable battery assembly.

FIG. 7 shows a schematic section view of an alternative embodiment of a rechargeable battery assembly 6 in which the drying agent of the filter device 8 can be regenerated. This embodiment of the rechargeable battery assembly 6 differs from the embodiment of the rechargeable battery assembly 6 according to FIG. 6 in that in the regenerating mode not only the air path to the lithium-air rechargeable batteries 1 but also to the central air inlet 15 is blocked. The air paths can be blocked, for example, by means of shutters. The heated inlet air L or hot exhaust air A of the lithium-air rechargeable batteries 1 flows through the lateral air inlet 13 into the housing 7, flows through the filter device 8, and flows then through the lateral air inlet 14 as moisture-laden exhaust air A' out of the housing 7 again.

Figure 8A:
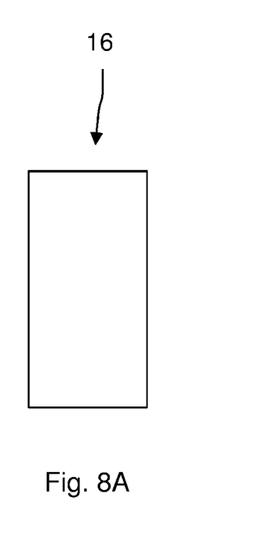
FIGS. 8A-8E show schematic views of different embodiments of a heating element.
Figure 8B:
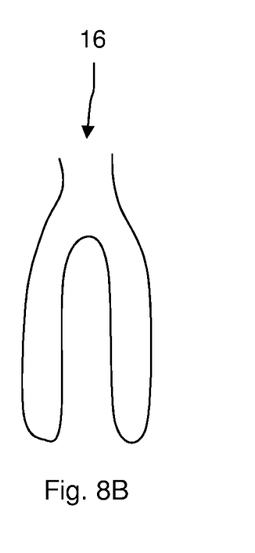
Figure 8C:
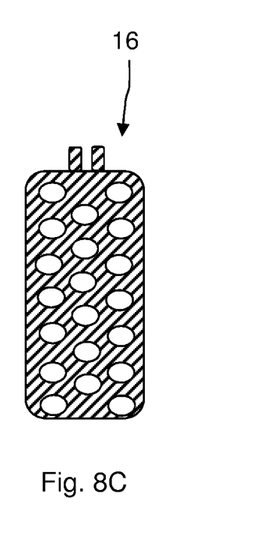
Figure 8D:
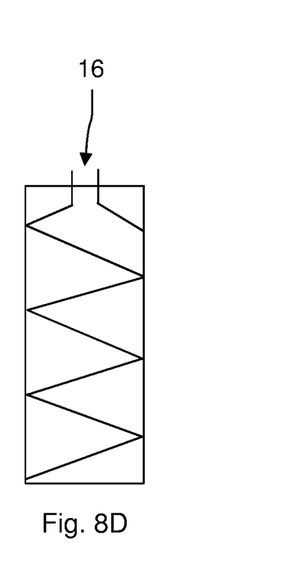
Figure 8E:
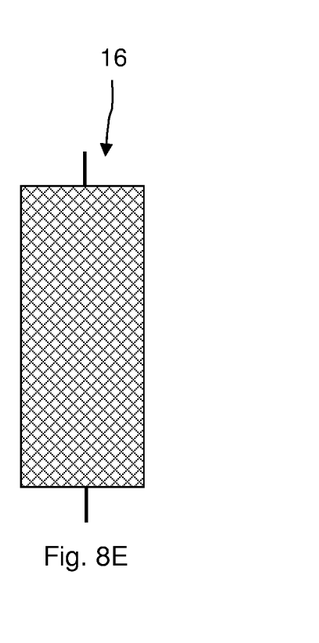

FIGS. 8A to 8D show different embodiments of heating element 16 for heating the inlet air L for regenerating the drying agent. FIG. 8A shows a heating element 16 in the form of a flat element. This heating element can be placed onto the filter device 8. FIG. 8B shows a heating element 16 with a heating wire in a meander shape. FIG. 8C shows a heating element 16 that is formed as a heating film with holes or penetrations. The heating film can be a PCT element (positive temperature coefficient). FIG. 8D shows an embodiment in which the heating element 16 is formed as a heating wire which is wound about the filter device 8. In the embodiment according to FIG. 8E, the heating element 16 is a conducting fabric or fleece pad which heats up. For example, the fabric or nonwoven can be coated with carbon nanotubes.

Figure 9:
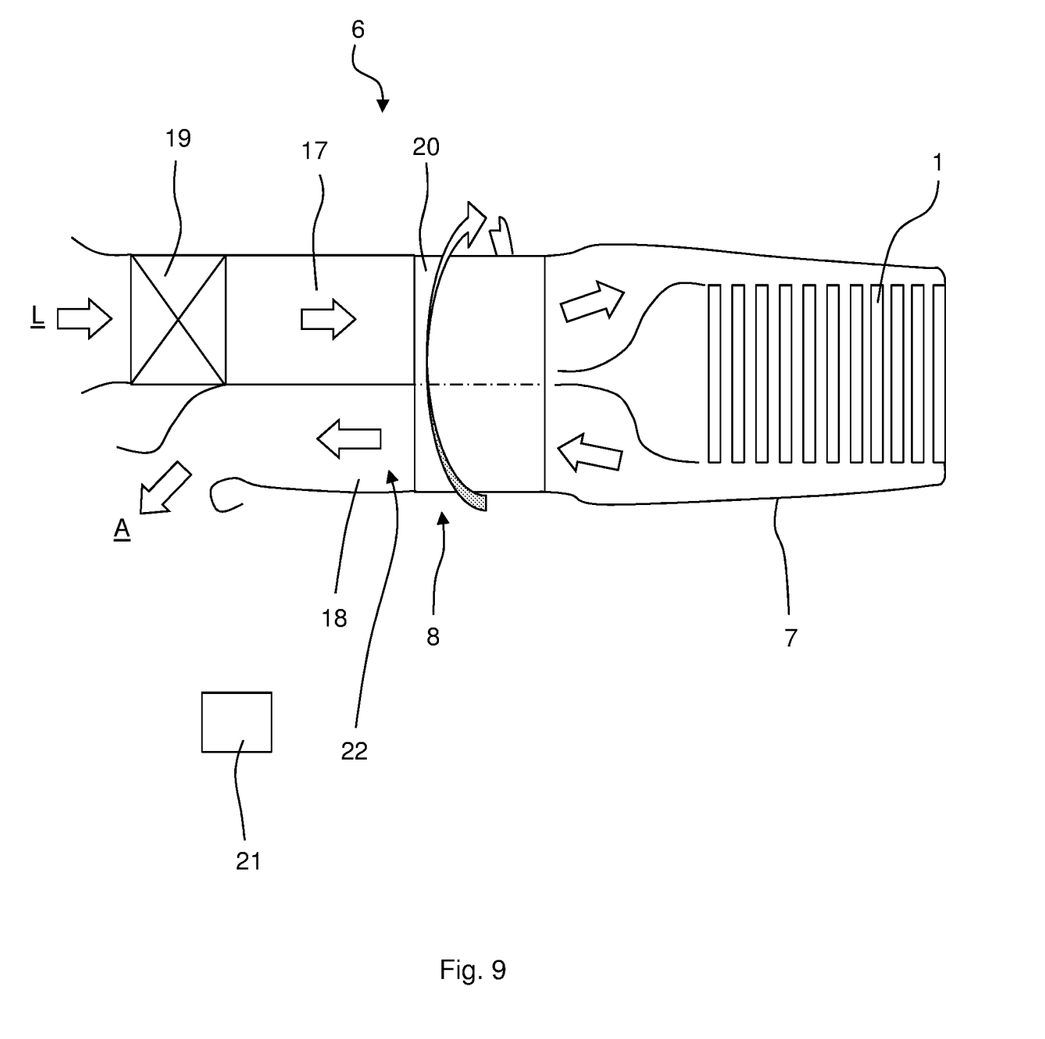
FIG. 9 shows a schematic section illustration of a further embodiment of a rechargeable battery arrangement.

FIG. 9 shows a further embodiment of a rechargeable battery assembly 6. In the housing 7 of the rechargeable battery assembly, a first air path 17 for supply of inlet air L to the lithium-air rechargeable batteries 1 and a second air path 18 for discharging the exhaust air A from the lithium-air rechargeable batteries 1 are provided. The air paths 17, 18 can form a flow deflecting device 22 of the rechargeable battery assembly 6. The filter device 8 comprises a filter element 19 provided in the first air path 17 for filtering the inlet air L. The filter element 19 can be configured to remove particles and harmful gases from the inlet air L. The filter device 8 comprises moreover a rotary storage device 20, rotatable relative to the housing 7, for removing moisture from the inlet air L. In this way, a continuous regeneration of the employed drying or sorption agent can be achieved. In this context, one half of the rotary storage device 20 is used as a filter while a second half thereof is regenerated. In this context, the exhaust air A which is heated by the lithium-air rechargeable batteries 1 assists in regenerating the drying or sorption agent. An auxiliary heating device in the form of a heating element 16 can be designed to be smaller or can be entirely eliminated. Moreover, the rotary storage mass has the advantage of heat transfer. The inlet air L for the lithium-air rechargeable batteries 1 can be preheated by the rotary storage device 20. This is in particular advantageous for a so-called cold start phase because the lithium-air rechargeable batteries 1, similar to a fuel-cell system, will reach in a shorter period of time the operating temperature.

The rechargeable battery assembly 6 comprises moreover a control and/or regulating device 21 that by means of sensor devices, for example, temperature or humidity sensors, and by control of valve devices controls the air flow through the housing 7. For example, a rotary speed regulation can be performed for the continuous regeneration by means of the rotary storage device 20. Air paths, sensor devices, actuators such as flaps or valve devices as well as the control device 21 are integrated in the housing 7. Preferably, the housing 7 is an injection molded component. The lithium-air rechargeable batteries 1 can be arranged sequentially or in parallel. The filter device 8 and the lithium-air rechargeable batteries 1 can be arranged in a common compact housing 7 or can be arranged spatially separated.

By conditioning the inlet air L for the lithium-air rechargeable batteries 1 based on their requirements in regard to the absence of particles and harmful substances as well as the exclusion of humidity or adjustment of a defined humidity, the rechargeable battery assembly 6 is usable under real conditions in a vehicle. By conditioning the inlet air L, the lithium-air rechargeable batteries 1 are protected from becoming damaged. The service life of the lithium-air rechargeable batteries 1 is increased and the use under different conditions is enabled. Due to the sensor devices, a change of the filtration performance or drying performance is determined early on and can be displayed as a state indication or maintenance indication by means of a corresponding indicating device. The embodiment of the rechargeable battery assembly 6 according to FIG. 9 with the rotary storage device 20 enables an extended service life of the drying or sorption agent. In this way, the operating costs are reduced while maintaining the correct operating conditions for the lithium-air rechargeable batteries 1.

What is claimed is:
1. A rechargeable battery assembly for a vehicle, the rechargeable battery assembly comprising:
 a housing having
   an inlet air opening;
   an exhaust air opening;
   at least one metal-air rechargeable battery arranged in the housing;
   a filter device arranged in the housing and configured to condition inlet air of the at least one metal-air rechargeable battery such that the inlet air exhibits a predetermined air humidity before reaching the at least one metal-air rechargeable battery;

wherein the housing has a first air path channeling inlet air from the air inlet opening to the at least one metal-air rechargeable battery;

wherein the housing has a second air path channeling heated exhaust air from the at least one metal-air rechargeable battery to the exhaust air opening;

wherein the filter device comprises a rotary storage device having a drying or sorption agent removing moisture from the inlet air, the rotary storage device rotatable to a first position in which:
- a first portion of the rotary storage device is connected to the first air path and receives inlet air before reaching the at least one metal-air rechargeable battery, the drying or sorptive agent removing moisture from the inlet air; and
- a second portion of the rotary storage device is connected to the second air path and receives exhaust air from the at least one metal-air rechargeable battery, wherein waste heat in the exhaust air regenerates the drying or sorptive agent in the second portion; and wherein the rotary storage device is rotatable to a second position in which:
- the second portion of the rotary storage device is connected to the first air path and receives inlet air before reaching the at least one metal-air rechargeable battery, the drying or sorptive agent removing moisture from the inlet air; and
- the first portion of the rotary storage device is connected to the second air path and receives exhaust air from the at least one metal-air rechargeable battery, wherein waste heat in the exhaust air regenerates the drying or sorptive agent in the first portion.

2. The rechargeable battery assembly according to claim 1, wherein
the drying or sorptive agent comprises silica beads.

3. The rechargeable battery assembly according to claim 2, wherein
the drying agent is continuously regenerated by the rotary storage device.

* * * * *